Feb. 28, 1956   R. E. SEIDLE   2,736,443
LOADING AND UNLOADING DEVICE FOR VEHICLES
Filed March 5, 1951   4 Sheets-Sheet 3
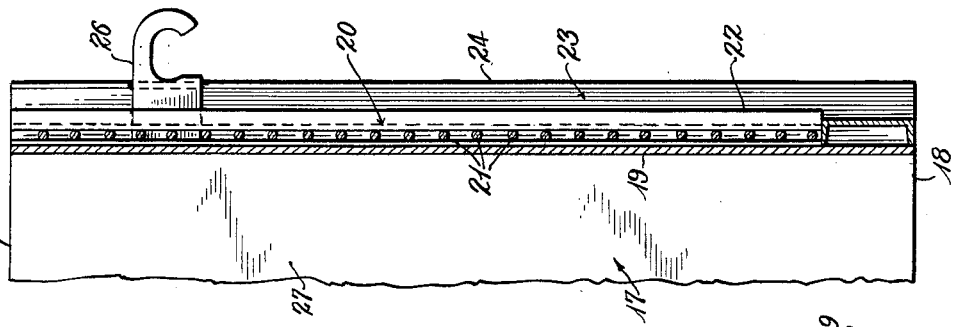
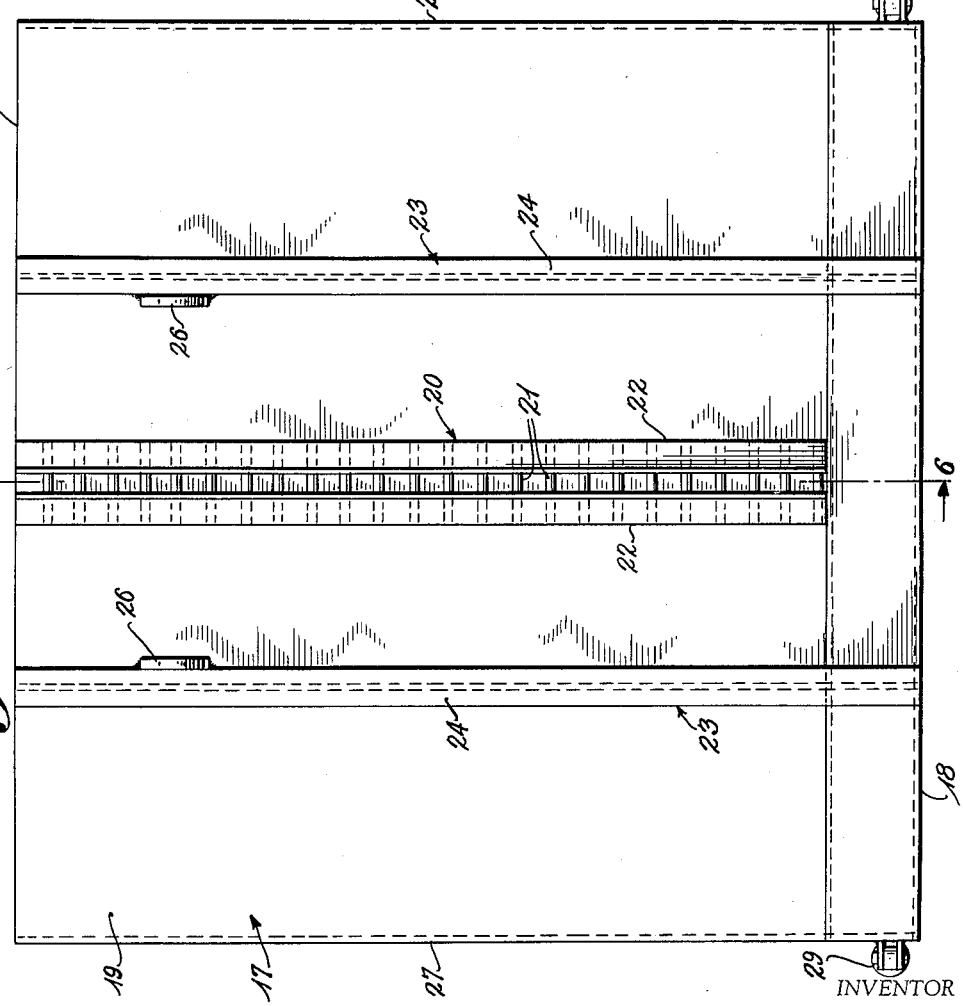
INVENTOR
*Ralph E. Seidle*
BY *Ernest F. Mechlin*
HIS ATTORNEY

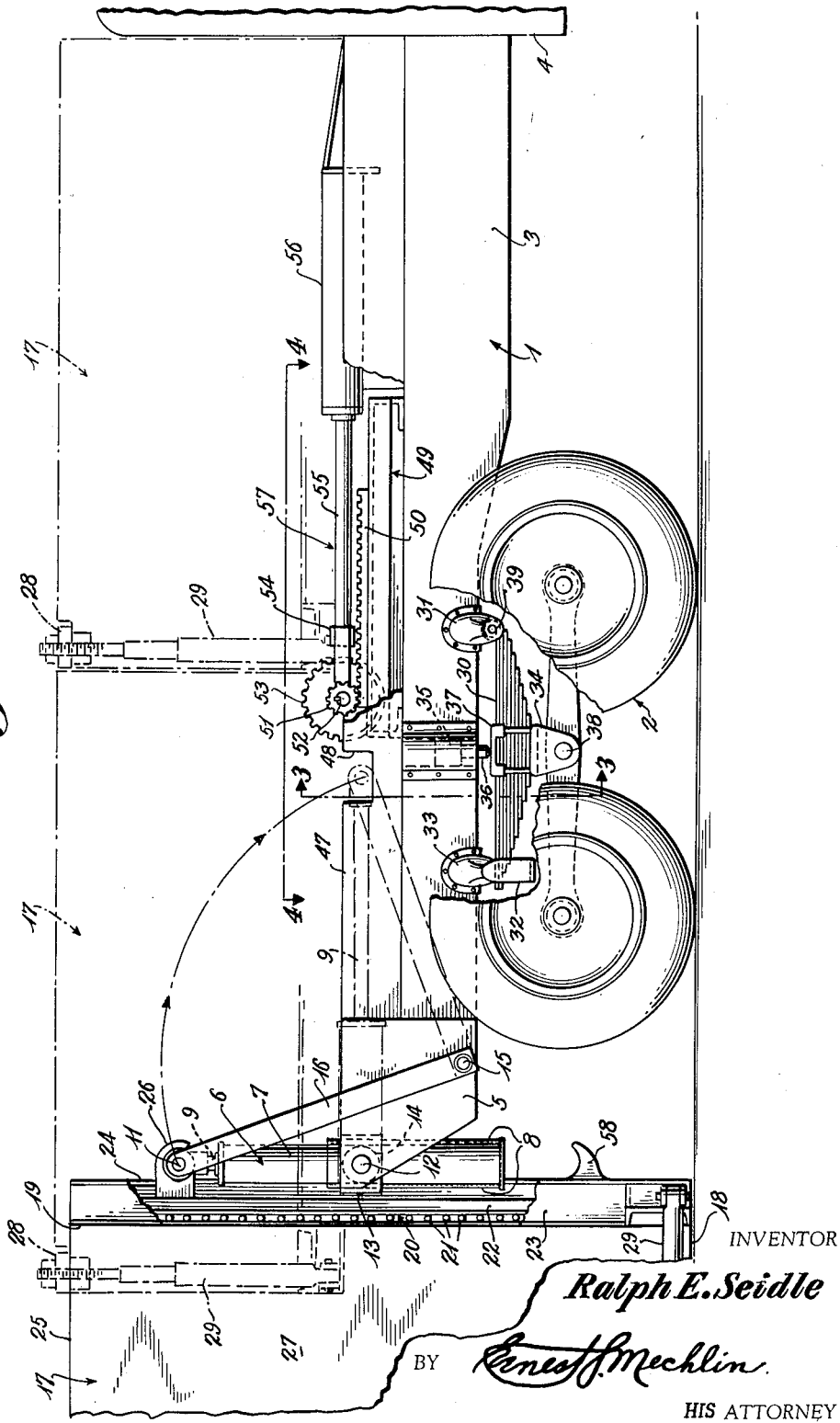

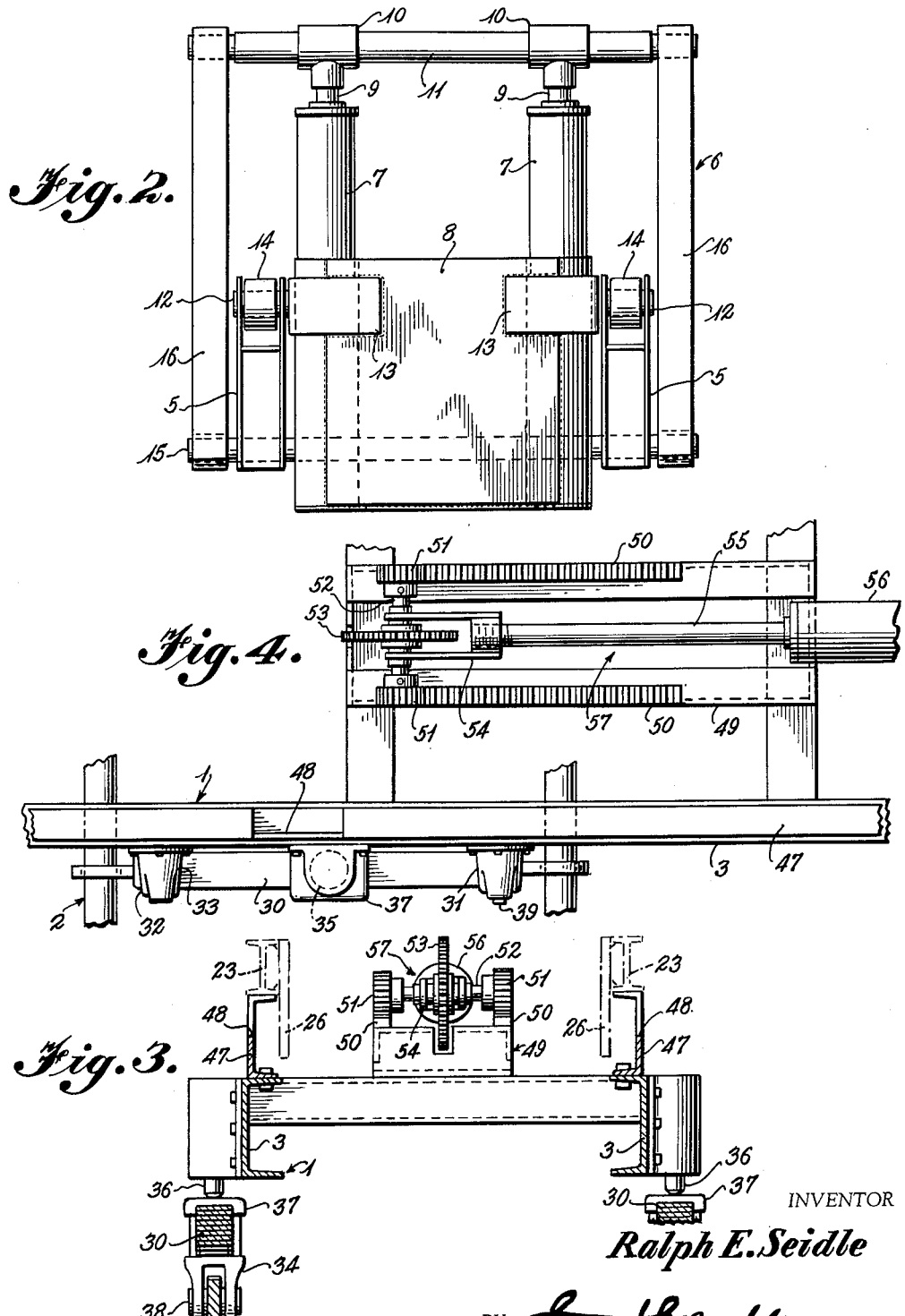

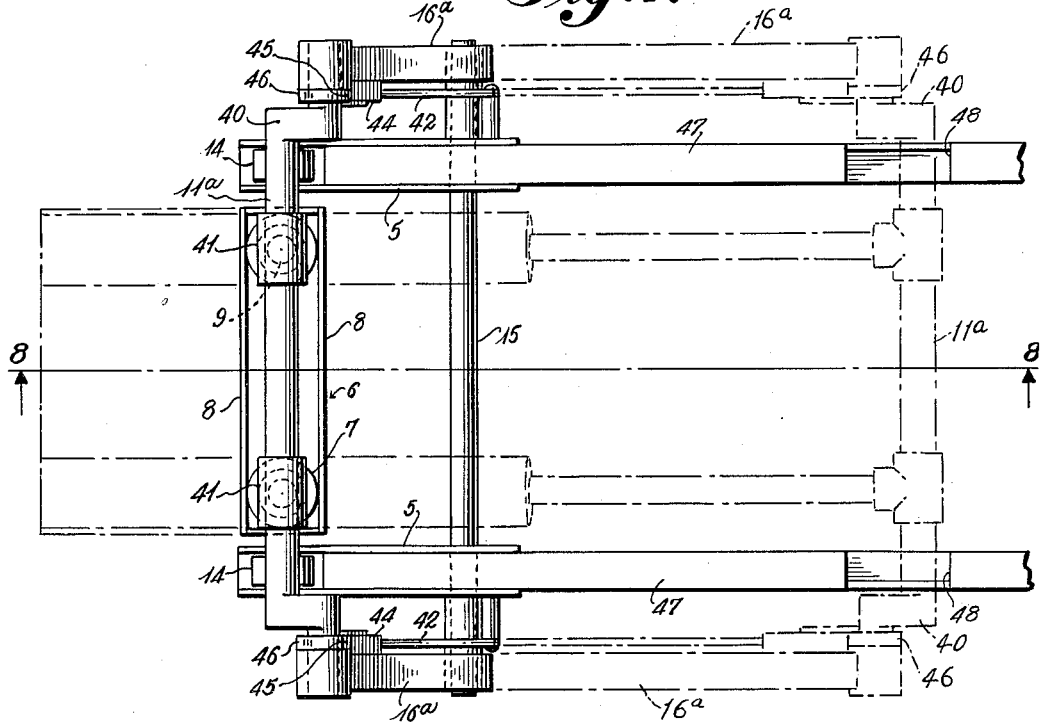
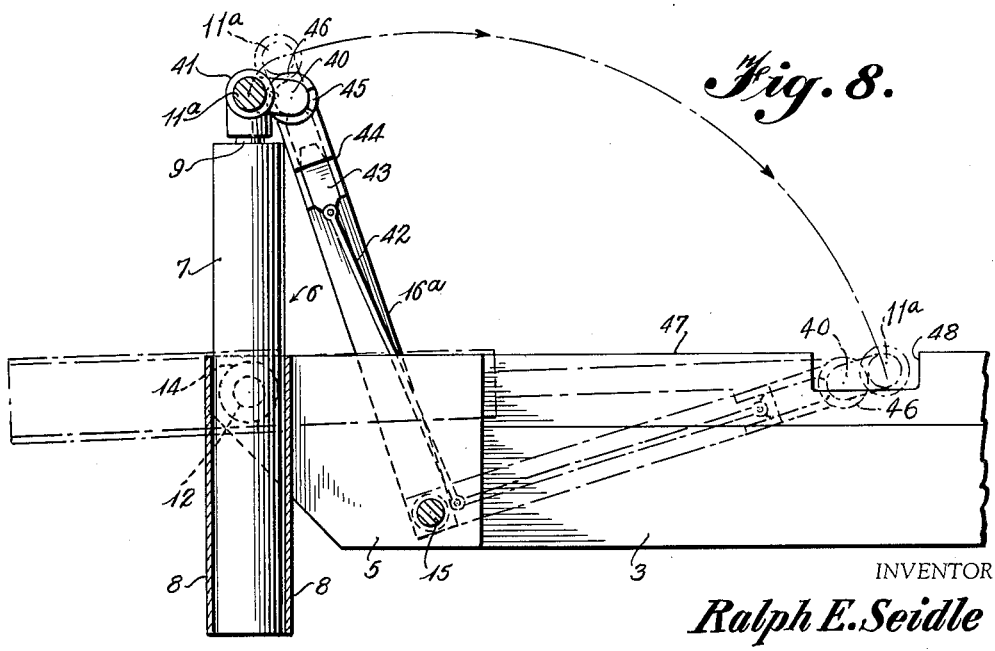

United States Patent Office 2,736,443
Patented Feb. 28, 1956

2,736,443

LOADING AND UNLOADING DEVICE FOR VEHICLES

Ralph E. Seidle, Martinsville, Va.

Application March 5, 1951, Serial No. 213,872

15 Claims. (Cl. 214—146.5)

This invention relates to trucks and other hauling apparatus and more particularly to loading and unloading devices therefor.

The primary object of the invention is to provide an improved device for loading and unloading hauling apparatus.

Another object of the invention is to provide an improved device for use with hauling apparatus for handling palletized loads.

An additional object of the invention is to provide an improved device for use with hauling apparatus for handling palletized loads, in which a plurality of loads may be hauled in tandem.

A further object of the invention is to provide a load-palletizing body and cooperating mechanism mountable on hauling apparatus, by which a plurality of palletized loads may be handled by the apparatus and securely held on the apparatus in transit.

Another object of the invention is to provide one or more load-carrying bodies and associated mechanism mountable on hauling apparatus, by which the apparatus is enabled to be utilized as both a palletized load-hauler and a dumping apparatus for non-palletized loads.

Other objects and advantages of the invention will appear hereinafter in the detailed description, be particularly pointed out in the appended claims and illustrated in the accompanying drawings, in which:

Figure 1 is a side elevational view of the loading and unloading device of the present invention, with the hoisting mechanism on the hauling apparatus shown in position to raise a palletizing body;

Figure 2 is a rear elevational view of the hoisting mechanism of Figure 1, with the palletizing body removed;

Figure 3 is a transverse sectional view, taken along the lines 3—3 of Figure 1;

Figure 4 is a fragmentary plan view, taken along the lines 4—4 of Figure 1;

Figure 5 is an elevational view of the underside of the palletizing body;

Figure 6 is a vertical sectional view, taken along the lines 6—6 of Figure 5, without a locking hook, the latter being required on only the rearmost palletizing body;

Figure 7 is a fragmentary plan view, in which the hoisting mechanism has been modified to adapt it to engage and disengage the palletizing body without shifting the chassis of the truck; and Figure 8 is a vertical sectional view, taken along the lines 8—8 of Figure 7.

Referring now in detail to the drawings in which like reference characters designate like parts, the improved loading and unloading device of the present invention has been applied, for purposes of illustration, to the hauling of bricks or like palletizable loads by a truck or other hauling vehicle. In its illustrated form, the truck 1 is of the heavy-duty type and provided with a dual rear wheel assembly 2 on either side, on which is supported in the usual fashion a conventional frame or chassis 3, the latter carrying, adjacent its front end, a cab 4.

Mounted or carried at the rear of the truck on transversely spaced hangers 5, here in the form of gusset plates of substantially trapezoidal shape, which may be welded or otherwise rigidly connected to the underframe, is the load-hoisting mechanism, designated generally as 6. For heavy-duty, this mechanism is comprised of a pair of transversely spaced hydraulic or other fluid pressure cylinders 7, which are preferably connected into a unitary structure by longitudinally spaced cross-plates 8. The piston rods 9 of these cylinders project thereabove when in the hoisting position shown in Figure 1 and carry, at their upper ends, heads 10 on which is supported a cross-rod or bar 11, which serves as a load-lifting or supporting member. The pistons 9 are rotatably or pivotally mounted between the gusset plates or other side brackets 5 on stub axles or shafts 12 anchored to the cylinder unit through straps or the like 13, welded thereto, the axles extending transversely through the gusset plates and each carrying a roller 14. Extending through and connecting the gusset plates below the cross-rod and forwardly of the stub axles 12, and projecting transversely beyond the sides of the plates, is a cross-shaft 15. On the outer ends of this cross-shaft, beyond the plates, are pivotally or rotatably mounted the lower ends of a pair of transversely spaced lifting arms or links 16, the upper ends of which rotatably or pivotally engage the projecting ends of the cross-rod 11. With this link fixing the distance between the cross-rod and cross-shaft, application of fluid pressure to the cylinders 7 will cause their piston rods to rise and force the rod 11 in extending or being displaceable radially of the axles 12, to swing or move in a circular arc about the shaft 15 as its axis or pivot point, carrying with it the associated cylinders, this movement continuing until the mechanism has reached the position shown in broken line in Figure 1.

To utilize the movement imparted to the hoisting mechanism through its fixed-length link or lifting arm 16, there is provided a body, container or pack 17 of U or channel shape in transverse section and, for palletized loads, preferably open at one end, its lower or outer end 18. The base plate or connecting web 19 of this body has mounted on its underside a centrally disposed, longitudinally extending rack 20 which may conveniently be formed of a plurality of longitudinally spaced rods or pins 21 attached and fixed in position relative to the body by spaced confronting angle irons 22. Also attached to the underside of the base plate 19 and extending longitudinally thereof, substantially parallel to the rack 20, are a pair of I-beams or like members 23, one on either side of the rack. These I-beams are of greater depth or projection, normal to the underside of the body, than the angle irons 22 and provide, by their outer flanges, shoes or skids 24 which have the same spacing and are adapted to engage the rollers 14 of the hoisting mechanism. Adjacent the upper or inner end 25 of the body are a pair of spaced, downwardly or inwardly opening lifting hooks 26 which may be welded to the inner or confronting sides of the I-beams 23.

When the body 17 is employed for handling a palletized load, such as bricks, the body is stood on its lower end 18 in position to encompass or embrace between its sides 27 a stack of bricks or the like (not shown). The lower end of the body being open, the lowermost course or tier of the stack of bricks is clamped or grasped between a clamping bar 28 and the reinforced lower end portion of the base plate 19. This being accomplished by connecting the clamping bar to the body on either side by clamping cylinders or like adjustable pulling or tensioning devices 29 which are hinged or otherwise suitably connected to the body. So clamped, the lowermost course forms a pallet on which the remaining bricks of the stack are readily supported.

As previously mentioned, the load-supporting cross-bar 11 describes an arcuate path when actuated and is thus not adapted to seat itself within the lifting hooks 26 on the body prior to the lifting of the latter. Preliminary upward movement of the supporting bar to enable it to engage the lifting hooks is accomplished, in the embodiment of Figure 1, by pivotally attaching the forward end of each of the springs 30 of the rear wheel assembly 2 to a forward shackle 31 on the frame 3. The other or rear end of each of the springs is carried or floats in an opening 32 of an open rear shackle 33, to permit relative vertical movement between the shackle and the spring. Affixed to the frame, intermediate the forward and rear shackles, 31 and 33, and overlying the main shackles or clamps 34 of the springs, are a pair of hydraulic or other fluid pressure lifting jacks 35, having downwardly extendable pistons 36 which are adapted to bear against the upper faces of pads 37 of the main shackles. On actuation of the jacks, their piston rods are extended and act through the pads and main shackles against the supporting trunnions 38 of the wheel assembly. The rear ends of the springs 30, floating in the rear shackles 33, apply no force opposing the jacks, thus enabling the jacks freely to lift the rear end of the frame 3 relative to the rear wheels, in process causing the springs to pivot about the shackle bolts 39 by which they are connected to the forward shackles 31. Since the pads 37 tilt during this movement relative to the associated piston rods 36, the latter are preferably provided with arcuately convex or cylindrical pad-engaging ends to maintain line contact with the pads during such movement. As the rear end of the frame is lifted upwardly by the jacks 35, the lifting shaft 11 is brought into engagement with the hooks 26 of the body 17, against which the truck has previously been backed. Actuation of the main cylinders 7 then causes the supporting bar to pivot about the lower shaft 15, pivoting or swinging the body 17 relative to the frame about the bar, until the body has been deposited on the frame in a substantially horizontal position. During this movement, the intermediate portion of the body is supported through the shoes 24 on the rollers 14 of the hoisting assembly.

A modified form of the hoisting mechanism by which the cross-rod 11 can be raised and lowered relative to the lifting hooks 26 on the body 17 so as to be engageable and disengageable therewith, without vertical movement of the frame 3 relative to the rear wheel assembly 2, is shown in Figures 7 and 8. In this form of the invention, both vertical and arcuate movement of a cross-rod 11a is obtained during or in the course of its reciprocation or actuation by the fluid pressure mechanism by the provision of a lost motion connection between the cross-rod and the associated links 16a. For this purpose, the cross-rod 11a, corresponding to the cross-rod 11 of the first embodiment, and engageable intermediate its ends with the hooks 26 has its outer ends beyond its hook-engaging portion offset to provide integral crank arms 40 through which it is pivotally connected to lifting arms or links 16a, pivoted on the cross-shaft 15. By rotatably journaling the cross-rod 11a in the collars or heads 41 affixed to the ends of the piston rods 9, actuation of the cylinders 7 is enabled initially to move the hook-engaging portion of the cross-rod intermediate the crank arms 40 substantially vertically to the limit of the offset, before the cross-rod is caused to move in an arcuate or circular path under control of the links 16a. To ensure that the crank arms 40 and the associated links 16a, once in line, will be so maintained during the arcuate travel of the cross-rod, regardless of any frictional resistance between the rod and the lifting hooks 26, means are provided for locking the links and crank arms in alignment, except adjacent the vertical position of the cylinders 7. This is accomplished in the illustrated embodiment by pivotally mounting on the hangers 5, adjacent the cross-shaft 15, push rods 42, the upper ends of which are pivotally or swivelly connected to latch or lock members 43 slidably carried within guideways 44 formed in the upper end portions of the links 16a. These latches are adapted to seat in slots or notches 45 formed in collars 46, keyed or otherwise affixed to the outer ends of the cross-rod 11a, the push rods being so positioned relative to the cross-shaft 15 and the latch of such length, as to interlock the links and cross-rod 11a after the latter has passed through the initial portion of its arc, the arrangement in the illustrated embodiment requiring some 30° of travel of the cross-rod before interlocking occurs. On reverse movement of the cross-rod, the latch 43 will be retracted at the same point, thereby releasing the cross-rod and permitting full retraction of the latter to disengage it from the lifting hooks 26.

Once a load has been hoisted onto the truck, provision is made for moving or sliding this load toward the forward end of the truck to enable it to accommodate one or more additional loads in tandem arrangement. This is obtained by mounting on the frame 3 a pair of spaced channel members 47, extending substantially continuously, longitudinally of the frame and slotted or recessed, as at 48, to form a seat which stops or limits the forward movement of the lifting shaft 11. Forwardly of the slots 48, there are mounted on the subframe 49 a pair of spaced, longitudinally extending racks 50, on each of which rides a pinion gear 51. These gears are keyed to a common shaft 52 to which is also keyed a sprocket wheel or gear 53 which is positioned centrally, transversely of the subframe 39, and adapted to engage and mesh with the upper end portion of the rack 20 of the body 17 after the body has been swung to horizontal position by the lifting shaft 11. The common shaft 52 of the several gears is journaled in a yoke 54 which straddles the sprocket gear 53 and is attached at its opposite end to a horizontally reciprocable piston rod 55 of a hydraulic or other fluid pressure cylinder 56, the latter being fixed to the frame 3. With the upper faces of the longitudinal channels 47 providing tracks or slides on which the shoes 24 of the body are adapted to ride or slide, retraction of the piston rod 55 within its cylinder 56 will move the body forward by the engagement of the sprocket gear 53 with the rack 20 of the body, the ratio of the pinion gear to the sprocket gear being such that a full stroke of the piston rod 55 will move the body 17 substantially to the cab 4. It has been mentioned that the rack of the body is preferably formed of spaced rods 21 secured to the body by confronting angle irons 22. The angle irons not only serve to attach the rods but, by enclosing the engaged portion of the sprocket gear, also prevent lateral or transverse shifting of the body relative to the truck.

After the first body has been shifted from the hoisting mechanism 6 to the shifting mechanism 57, composed of the cylinder 56 and its associated structure, the jacks 35 are collapsed returning the frame 3 to the support of its springs 30. If a second body is then to be picked up, the piston rods 9 of the hoisting cylinders 7 are retracted, swinging the hoisting mechanism to its initial upright position. Thereafter, the truck is backed up to a second body and the latter is loaded in the same manner as the first. The loading operation is then repeated until the truck is loaded to capacity.

In order to secure or lock the last load against accidental displacement, as well as to utilize to the fullest extent possible the space available on the frame 3 of the truck, the rear or last body to be loaded differs from the other bodies by being provided with a pair of upwardly or inwardly facing stop or opening or locking hooks 58, attached adjacent the lower end of the body 17 and positioned to engage the rollers 14 of the hoisting mechanism when the lifting shaft 11 is seated in the slots 48 of the channel members 47. Consequently, when the last body has assumed its horizontal, loaded position, it is locked fore and aft by the opposing lifting and locking hooks, 26 and 58.

After the truck has carried the loaded bodies or packs 17 to their destinations, the bodies, in the first embodiment, are unloaded by first raising the rear end of the frame 3 by the lifting jacks 35 and then retracting the piston rods 9 of the lifting mechanism 6 to swing the rear body up to vertical position. The lifting jacks are then deenergized or released to clear the lifting shaft 11 of the lifting hooks 26 of the rear body. The same result is accomplished in the second embodiment merely by retracting the piston rods. The truck is then moved to the location at which the next body is to be unloaded, usually after the lifting mechanism has first been returned to its horizontal position. The lifting jacks 35 are then reactivated to raise the rear end of the truck and the piston rod 55 of the shifting mechanism 57 is then extended to shift the next body rearwardly until its lifting hooks engage the lifting shaft 11. The hoisting mechanism is then rotated about the lower shaft 15 to swing the body to vertical position, after which pressure is released from the lifting jacks to disengage the lifting mechanism from the second body. This operation is thereafter repeated as often as necessary to unload all the bodies from the truck. After the loads of the several bodies have been unclamped, the then empty bodies may be reloaded on the truck in the manner aforementioned. The operation is the same with the modified mechanism of Figure 7, except that jacks are not used, the hoisting mechanism itself automatically disengaging the lifting hooks 26 after each body has been deposited on the ground.

Since the hoisting mechanism 6 may readily be stopped at any point in the circular path of movement of the lifting shaft 11, the device of the present invention is also adapted to be employed as a multiple-unit dump truck. In such use, the open rear ends of the several bodies 17 would be closed by the usual tail-gate, and the bodies would, of course, be filled after they had been placed on the truck. On reaching destination, the loaded bodies would then be dumped one at a time, the device entailing over the usual dump truck merely the temporary removal of each body as it is unloaded.

From the above detailed description, it will be apparent that there has been provided an improved loading and unloading device, by which a plurality of palletized loads can readily be loaded on and unloaded from hauling apparatus and, with but minor modification, enables the apparatus to be utilized as a multiple-dumping apparatus. It should be understood that the described and disclosed embodiments are merely exemplary of the invention and that all modifications are intended to be included which do not depart either from the spirit of the invention or the scope of the appended claims.

Having described my invention, I claim:

1. A loading and unloading device for vehicles comprising fluid pressure means pivotally mounted on a vehicle, a load-supporting member carried and reciprocable by said fluid pressure means, means connected to said member for causing said member to move in an arcuate path during reciprocation thereof, and means for enabling said member to move in a substantially straight path independently of said arcuate movement.

2. A loading and unloading device for vehicles comprising fluid pressure means pivotally mounted on a vehicle, a supporting member carried and reciprocable by said fluid pressure means radially of a pivot thereof, means connected to said member for causing said member to move in an arcuate path during reciprocation thereof, and means for moving said member in a substantially straight path independently of said arcuate movement.

3. A loading and unloading device for vehicles comprising fluid pressure means oscillatable about a pivot on a vehicle, a supporting member carried and reciprocable by said fluid pressure means radially of said pivot, means for causing said supporting member to move in an arcuate path during reciprocation thereof, and lost motion means associated with said causing means for enabling said supporting member to move in a substantially straight path independently of said arcuate movement.

4. A loading and unloading device for vehicles comprising fluid pressure means oscillatable about a pivot on a vehicle, a supporting member carried and reciprocable by said fluid pressure means radially of said pivot, link means pivotally mounted on said vehicle and connected to said member for causing said member to move in an arcuate path on reciprocation thereof, and means connecting said link means and member for enabling said member to move in a substantially straight path independently of said arcuate movement.

5. A loading and unloading device for vehicles comprising fluid pressure means oscillatable about a pivot on a vehicle, a supporting member carried and reciprocable by said fluid pressure means radially of said pivot, link means pivotally mounted on said vehicle and connected to said member for causing said member to move in a circular path about a pivot of said link means, and means connecting said link means and member for enabling said member to move in a substantially straight path independently of said circular movement.

6. A loading and unloading device for vehicles comprising fluid pressure means oscillatable about a pivot on a vehicle, a supporting member carried and reciprocable by said fluid pressure means radially of said pivot, a container supportable on and releasably engageable by said supporting member, link means connected to said member for moving said member in an arcuate path on reciprocation thereof, means for varying the height of said supporting member relative to said container for engaging and disengaging said container, said fluid pressure means on engagement of said member with said container swinging said container relative to said vehicle on said supporting member, and means on said vehicle and engageable with said container for shifting said container longitudinally of said vehicle.

7. A loading and unloading device for vehicles comprising fluid pressure mechanism pivotally mounted on a vehicle frame, a supporting member mounted on said mechanism and reciprocable thereby radially of a pivot thereof, said member being disposed transversely of said frame, link means connecting said member to a point on said frame spaced from said pivot for moving said member in a circular path about said spaced point on reciprocation thereof, a container, hook means on an underside of said container engageable with said transverse member for swinging said container onto and off of said vehicle on said member during reciprocation thereof, and means on said frame for varying the height of said member relative to said container and engaging and disengaging said member from said hook means.

8. A loading and unloading device for vehicles comprising fluid pressure mechanism pivotally mounted on a vehicle frame, a supporting member mounted on said mechanism and reciprocable thereby radially of a pivot thereof, said member being disposed transversely of said frame, link means connecting said member to a point on said frame spaced from said pivot for causing said member to move in a circular path about said spaced point on reciprocation thereof, a container, hook means on said container engageable with said transverse member for swinging said container onto said vehicle about said member during reciprocation thereof, means associated with said mechanism and cooperating with said transverse member for supporting said container during swinging thereof, means associated with said mechanism for varying the height of said member relative to said container and engaging and disengaging said member and said hook means, and drive means on said frame engageable with said container when said container is on said vehicle for moving said container longitudinally of said frame.

9. A loading and unloading device for vehicles comprising fluid pressure mechanism pivotally mounted on a vehicle frame, a supporting member mounted on said mechanism and reciprocable thereby radially of a pivot thereof, said member being disposed transversely of said frame, link means connecting said member to a point on said frame spaced from said pivot for causing said member to move in a circular path about said spaced point on reciprocation thereof, a container, hook means on an underside of said container engageable with said transverse member for swinging said container onto and off of said frame about said member during reciprocation thereof, means associated with said mechanism and cooperating with said transverse member for supporting said container during swinging thereof, rack means on said underside of said container, and gear means on said frame engageable with said rack means for moving said container longitudinally of said frame.

10. A loading and unloading device for vehicles comprising fluid pressure mechanism pivotally mounted on a vehicle frame, a supporting member carried by said mechanism and reciprocable thereby radially of a pivot thereof, said member being disposed transversely of said frame, link means connecting said member to a point on said frame spaced from said pivot for moving said member in a circular path about said spaced point on reciprocation thereof, a container, hook means on an underside of said container engageable with said transverse member for swinging said container onto said vehicle about said member during reciprocation thereof, means associated with said mechanism and cooperating with said member for supporting said container during swinging thereof, rack means on said underside of said container, gear means on said frame engageable with said rack means when said container is on said frame, and fluid pressure means for rotating said gear means and shifting said container longitudinally of said frame.

11. A loading and unloading device for vehicles comprising fluid pressure mechanism pivotally mounted on a vehicle frame, a supporting member carried by said mechanism and reciprocable thereby radially of a pivot thereof, said member being disposed transversely of said frame, link means connecting said member to a point on said frame spaced from said pivot for moving said member in a circular path about said spaced point on reciprocation thereof, a container, hook means on an underside of said container engageable with said transverse member for swinging said container onto said vehicle about said member during reciprocation thereof, roller means associated with said mechanism and cooperating with said transverse member for supporting said container during swinging thereof, rack means on said underside of said container, gear means on said frame engageable with said rack means when said container has been swung onto said frame by said mechanism, and fluid pressure means for rotating said gear means and shifting said container longitudinally of said frame.

12. A loading and unloading device for vehicles comprising fluid pressure mechanism pivotally mounted on a vehicle frame, a supporting member carried by said mechanism and reciprocable thereby radially of a pivot thereof, said member being disposed transversely of said frame, link means connecting said member to a point on said frame spaced from said pivot for moving said member in a circular path about said spaced point on reciprocation thereof, a plurality of containers each having a hook on an underside thereof engageable with said supporting member for swinging said containers onto and off of said frame about said member, roller means associated with said mechanism and cooperating with said member for supporting said containers on swinging thereof, rack means on said underside of said certain containers, gear means on said frame engageable with said rack means when said containers have been swung onto said frame, fluid pressure means for shifting said certain containers longitudinally of said frame, and hook means on one of said containers opposing said first-named hook means and engageable with said roller means on swinging of said containers onto said frame for locking said containers to said frame.

13. A loading and unloading device for vehicles comprising supporting means pivotally mounted on a vehicle and extendable radially of its pivot, link means pivotally mounted on said vehicle at a point spaced from said pivot of said extendable means, and a lost motion connection between said supporting and link means, said link means normally guiding said supporting member in an arcuate path, and said supporting member through said lost motion connection being movable in a substantially straight path independently of said arcuate path.

14. A loading and unloading device for vehicles comprising extendable means pivotally mounted on a vehicle, a supporting rod carried by said extendable means and displaceable thereby radially of its pivot, crank means integral with said supporting rod, and link means connected to said supporting means through said crank means and pivotally mounted on said vehicle at a point spaced from said pivot of said extendable means, said link means normally guiding said supporting rod in an arcuate path, and said rod through said crank means being movable in a substantially straight path independently of said arcuate path.

15. A loading and unloading device for vehicles comprising a container, a supporting member pivotally mounted on a vehicle frame and releasably engageable with said container, means for displacing said supporting member radially of its pivot, link means connecting said supporting member to said frame at a point spaced from said pivot for guiding said supporting member in a circular path about said point on displacement thereof, and jack means on and acting against a portion of said vehicle for varying the height of said frame and thereby said supporting member relative to said container for engaging and disengaging said supporting member and container.

References Cited in the file of this patent

UNITED STATES PATENTS

| Number | Name | Date |
| --- | --- | --- |
| 1,252,899 | Greer et al. | Jan. 8, 1918 |
| 1,268,598 | Moore | June 4, 1918 |
| 1,289,786 | Ittner | Dec. 31, 1918 |
| 1,371,392 | Penfield | Mar. 15, 1921 |
| 1,429,004 | Wick | Sept. 12, 1922 |
| 1,733,988 | Barnard | Oct. 29, 1929 |
| 1,947,264 | Johnson et al. | Feb. 13, 1934 |
| 2,189,052 | Anthony | Feb. 6, 1940 |
| 2,234,513 | Zimicki | Mar. 11, 1941 |
| 2,308,648 | De Vry et al. | Jan. 19, 1943 |
| 2,354,337 | Smith | July 25, 1944 |
| 2,542,425 | Oliver | Feb. 20, 1951 |
| 2,552,627 | Fontaine | May 15, 1951 |
| 2,592,324 | Oliver | Apr. 8, 1952 |
| 2,606,676 | Dempster | Aug. 12, 1952 |
| 2,677,476 | Bebinger | May 4, 1954 |